(12) United States Patent
Kupsch et al.

(10) Patent No.: US 12,448,503 B2
(45) Date of Patent: Oct. 21, 2025

(54) NECK-IN SUPPRESSION FOR TUBULAR LDPE BASED POLYMERS FOR EXTRUSION COATING AT MEDIUM AND HIGH LINE SPEED

(71) Applicant: Dow Global Technologies LLC, Midland, MI (US)

(72) Inventors: Eva-Maria Kupsch, Waedenswil (CH); Yifan Dong, Lake Jackson, TX (US); Sylvie Vervoort, Ghent (BE)

(73) Assignee: Dow Global Technologies LLC, Midland, MI (US)

( * ) Notice: Subject to any disclaimer, the term of this patent is extended or adjusted under 35 U.S.C. 154(b) by 368 days.

(21) Appl. No.: 17/631,091

(22) PCT Filed: Jul. 24, 2020

(86) PCT No.: PCT/US2020/043485
§ 371 (c)(1),
(2) Date: Jan. 28, 2022

(87) PCT Pub. No.: WO2021/021625
PCT Pub. Date: Feb. 4, 2021

(65) Prior Publication Data
US 2022/0251352 A1    Aug. 11, 2022

Related U.S. Application Data

(60) Provisional application No. 62/880,832, filed on Jul. 31, 2019.

(51) Int. Cl.
*C08L 23/06* (2006.01)
*C09D 123/06* (2006.01)

(52) U.S. Cl.
CPC ............ *C08L 23/06* (2013.01); *C09D 123/06* (2013.01); *C08L 2203/16* (2013.01); *C08L 2207/066* (2013.01)

(58) Field of Classification Search
CPC .............. C08L 23/06; C08L 2203/16; C08L 2207/066; C08L 23/04; C09D 123/06
See application file for complete search history.

(56) References Cited

U.S. PATENT DOCUMENTS

| | | |
|---|---|---|
| 3,264,272 A | 8/1966 | Rees |
| 3,322,734 A | 5/1967 | Rees et al. |
| 3,410,928 A | 11/1968 | Baum |
| 3,857,754 A | 12/1974 | Hirata et al. |
| 4,312,902 A | 1/1982 | Murase et al. |
| 4,766,174 A | 8/1988 | Statz |
| 6,437,046 B1 | 8/2002 | Morris |
| 6,500,556 B1 | 12/2002 | Morris et al. |
| 7,820,776 B2 | 10/2010 | Neuteboom et al. |
| 8,541,081 B1 | 9/2013 | Ranganathan et al. |
| 9,228,036 B2 | 1/2016 | Berbee et al. |
| 9,334,348 B2 | 5/2016 | Berbee et al. |
| 9,394,389 B2 | 7/2016 | Berbee et al. |
| 9,783,352 B2 | 10/2017 | Hausmann et al. |
| 10,144,789 B2 | 12/2018 | Nummila-Pakarinen et al. |
| 2002/0198323 A1* | 12/2002 | Morris ................. C09J 123/06 525/240 |
| 2004/0043238 A1* | 3/2004 | Wuest ................. B32B 15/08 428/500 |
| 2006/0014871 A1 | 1/2006 | Toriumi et al. |
| 2006/0073297 A1 | 4/2006 | Glick et al. |
| 2007/0225445 A1 | 9/2007 | Nguyen |
| 2009/0131593 A1 | 5/2009 | Perdomi |
| 2016/0304638 A1 | 10/2016 | Den Doelder et al. |

FOREIGN PATENT DOCUMENTS

| | | |
|---|---|---|
| CN | 104080851 A | 10/2014 |
| EP | 0721975 A1 | 7/1996 |
| EP | 1325092 A2 | 7/2003 |
| EP | 1854626 A1 | 11/2007 |
| EP | 2156949 B1 | 11/2014 |
| GB | 1041065 A | 9/1966 |
| JP | H03192607 A | 8/1991 |
| JP | 04311742 A * | 11/1992 |
| JP | H09109324 A | 4/1997 |
| JP | 2002500250 A | 1/2002 |
| JP | 2003118048 A | 4/2003 |
| JP | 2000001556 A | 11/2007 |
| JP | 2015000883 A | 1/2015 |

(Continued)

OTHER PUBLICATIONS

161/162 Communication dated Mar. 9, 2022, pertaining to European Patent Application No. 20754597.1, 3 pgs.

(Continued)

*Primary Examiner* — John D Freeman
(74) *Attorney, Agent, or Firm* — Dinsmore & Shohl, LLP

(57) ABSTRACT

Embodiments of this disclosure include polymer blends comprising at least 90% by weight low density polyethylene (LDPE) polymer; and from 1% to 10% by weight ethylene acrylate copolymer. The ethylene acrylate copolymer is the polymerized reaction product of: at least 50% by wt. ethylene, based on the total weight of the monomers present in the ethylene acrylate copolymer; from 2% to 40% by wt. alkyl acrylate, based on the total weight of the monomers present in the ethylene acrylate copolymer; and from 0 to 20 wt. % of monocarboxylic acid monomer, based on the total weight of the monomers present in the ethylene acrylate copolymer.

10 Claims, No Drawings

(56) References Cited

FOREIGN PATENT DOCUMENTS

| JP | 2015503664 | A  | 2/2015 |
|----|------------|----|--------|
| WO | 0107531    | A2 | 2/2001 |
| WO | 0228974    | A2 | 4/2002 |
| WO | 2005005534 | A1 | 1/2005 |
| WO | 2012044504 | A1 | 4/2012 |
| WO | 2013083285 | A1 | 6/2013 |
| WO | 2018094199 | A1 | 5/2018 |
| WO | 2019022974 | A1 | 1/2019 |

OTHER PUBLICATIONS

International Preliminary Report on Patentability dated Feb. 1, 2022, pertaining to PCT/2020/044200, 6 pgs.
161/162 Communication dated Mar. 9, 2022, pertaining to European Patent Application No. 20754539.1, 3 pgs.
International Preliminary Report on Patentability dated Feb. 10, 2022, pertaining to PCT Application No. PCT/ US2020/043485, 6 pgs.
International Preliminary Report on Patentability dated Feb. 1, 2022, pertaining to PCT Application No. PCT/ JS2020/043658, 6 pgs.
161/162 Communication dated Mar. 9, 2022, pertaining to European Patent Application No. 20754551.8, 3 pgs.
Chinese Office Action dated Sep. 29, 2023, pertaining to CN Patent Application No. 202080053890.6, 14 pgs.
Communication pursuant to Article 94(3) EPC dated Sep. 29, 2023, pertaining to EP Patent Application No. 20754539.3, 3 pgs.
Brazil Office Action dated Oct. 24, 2023, pertaining to BR Patent Application No. BR112022001345-0, 4 pgs.
Brazil Office Action dated Oct. 17, 2023, pertaining to BR Patent Application No. BR112022001238-1, 6 pgs.
Brazil Office Action dated Oct. 24, 2023, pertaining to Brazilian Patent Application No. BR112022001549-6, 3 pgs.
Argentine Substantive Examination Report dated Jan. 18, 2024, pertaining to AR Patent Application No. 20200102036, 2 pgs.
Argentine Substantive Examination Report dated Jan. 18, 2024, pertaining to AR Patent Application No. 20200102033, 2 pgs.
Argentine Substantive Examination Report dated Mar. 1, 2024, pertaining to AR Patent Application No. 20200102022, 3 pgs.
Balke et al. "A Strategy for Interpreting Multidetector Size-Exclusion Chromatograph Data II", Multidetector SEC Data in Plastic Waste Recovery (1992), 11 pgs.
International Search Report and Written Opinion dated Oct. 12, 2020, pertaining to Int'l Appl. No. PCT/US2020/043485 filed Jul. 24, 2020, 12 pgs.
International Search Report and Written Opinion dated Nov. 30, 2020, pertaining to Int'l Appl. No. PCT/US2020/044200 filed Jul. 30, 2020, 14 pgs.
International Search Report and Written Opinion dated Apr. 29, 2020, pertaining to Int'l Appl. No. PCT/CN2019/098558 filed Jul. 31, 2019, 11 pgs.
International Search Report and Written Opinion dated Oct. 28, 2020, pertaining to Int'l Appl. No. PCT/US2020/043658 filed Jul. 27, 2020, 14 pgs.
Kratochvil, P., Classical Light Scattering from Polymer Solutions, Elsevier, Oxford, NY (1987), 32 pgs.
Mourey et al. "A Strategy for Interpreting Multidetector Size-Exclusion Chromatography Data I" Systematic Approach to Multidetector SEC Data (1992), 11 pgs.
Williams et al. "The Construction of a Polyethylene Calibration Curve for Gel Permeation Chromatography Using Polystyrene Fractions" vol. 6, pp. 621-624 (1968), 4 pgs.
Zimm "Apparatus and Methods for Measurement and Interpretation of the Angular Variation of Light Scattering; Preliminary Results on Polystyrene Solutions" The Journal of Chemical Physics vol. 16, No. 12 (1948), 18 pgs.
Chinese Office Action dated Nov. 21, 2023, pertaining to CN Patent Application No. 202080052468.9, 14 pgs.
Chinese Office Action dated Dec. 7, 2023, pertaining to CN Patent Application No. 202080055564.9, 14 pgs.
Russian Office Action dated Jan. 17, 2024, pertaining to RU Patent Application No. 2022 104 735, 20 pgs.
ID Office Action dated Aug. 14, 2023, pertaining to ID Patent Application No. P00202201366, 6 pgs.
US Final Office Action dated May 14, 2024, pertaining to US Patent Application No. 17/631, 150, 15 pgs.
Indonesia Substantive Examination Report dated Apr. 4, 2024, pertaining to ID Patent Application No. P00202201385, 6 pgs.
Chinese Office Action dated May 22, 2024, pertaining to CN Patent Application No. 202080052468.9, 14 pgs.
Chinese Office Action dated Jun. 27, 2024, pertaining to CN Patent Application No. 202080055564.9, 10 pgs.
Japanese Office Action dated Aug. 6, 2024, pertaining to JP Patent Application No. 2022-50191, 12 pgs.
Japanese Office Action dated Aug. 20, 2024, pertaining to JP Patent Application No. 2022-505490, 8 pgs.
Japanese Office Action dated Jul. 23, 2024, pertaining to JP Patent Application No. 2022-504158, 10 pgs.
European Article 94(3) Communication dated Jul. 31, 2024, pertaining to EP Patent Application No. 20754539.3, 3 pgs.
US Notice of Allowance dated Oct. 15, 2024, pertaining to US Patent Application No. 17/631, 150, 10 pgs.
US Notice of Allowance dated Sep. 11, 2024, pertaining to US Patent Application No. 17/631, 107, 12 pgs.
Chinese Office Action dated Aug. 26, 2024, pertaining to CN Patent Application 2020800524689, 14 pgs.
Brazilian Office Action dated May 13, 2025, pertaining to Brazilian Patent Application BR 11 2022 001238 1, 5 pgs.
Brazilian Office Action dated Jul. 29, 2025, pertaining to BR Patent Application No. 112022001549.6, 4 pgs.

\* cited by examiner

NECK-IN SUPPRESSION FOR TUBULAR LDPE BASED POLYMERS FOR EXTRUSION COATING AT MEDIUM AND HIGH LINE SPEED

CROSS-REFERENCE TO RELATED APPLICATIONS

This application is a National Stage Entry under 35 U.S.C. § 371 of International Patent Application No. PCT/US2020/043485, filed Jul. 24, 2020, which claims priority to U.S. Provisional Patent Application No. 62/880,832, filed on Jul. 31, 2019, the entire disclosures of both of which are hereby incorporated by reference.

TECHNICAL FIELD

Embodiments of the present disclosure generally relate to applications for extrusion coating, in which the extrusion coatings include polymer blends having a low neck-in value at low to high line speeds.

BACKGROUND

Extrusion coating is a continuous fabrication process where the polymer is melt processed and extruded through a die to form a thin film and to be coated on a substrate or as a tie layer between two substrates. Processability is important for extrusion coating and there are two critical parameters for extrusion coating: neck-in and draw down. Neck-in is the polymer film shrinkage between the die exit and the coating substrate (i.e. during the air gap) and is considered a source of waste of material. Draw down refers to how fast the coating line can run and how thin the polymer film can be stretched. A good polymer for extrusion coating should have low neck-in (to minimize polymer waste) and high/sufficient draw down (to get a thin coating and high throughput).

Low density polyethylene (LDPE) polymers are branched polyethylene with high melt strength. The high melt strength of the polymer provides good processability for extrusion coating. The neck-in and draw-down depends on the polymer properties. For example, LDPE polymer with higher melt index generally have more neck-in but a higher draw-down; LDPE with lower melt index tend to have lower neck-in and lower draw-down. For a given equipment, lower neck-in and sufficient/higher draw-down is usually preferred.

The melt index and the melt strength of LDPE polymers may be affected by the reactor used to produce the polymer. Polymerization conditions such as temperature, pressure, and polymer concentrations vary widely in tubular reactor systems but tend to be more uniform than in autoclave reactor systems. The polymerization conditions in a tubular reactor lead to polymer compositions with lower molecular weight and/or increased short chain branching level in the low molecular weight fraction, which allows the polymer to be more processable. Tubular LDPE polymers tend to have a higher draw down for faster line speed and thinner coating thickness. In contrast, autoclave processes typically produce polymers with high molecular weight fractions. Generally, the autoclave LDPE have a lower neck-in value, because the polymer is more branched and has broader molecular weight distribution (MWD), and thereby autoclave LDPE polymers have more polymer entanglement to "resist" shrinkage. Autoclave LDPE tend to have lower neck-in than tubular LDPE. Generally, a tubular LDPE has a lower melt index (4-5 MI) and autoclave LDPE has a higher melt index (7-8 MI). The lower melt-index tubular LDPE usually have a greater neck-in value and faster draw down than the higher melt index of an autoclave LDPE polymer.

Polyethylene resins for extrusion coating on paper, board, aluminum, and other various materials are typically processed at high temperature conditions, for example, 270° C. to 350° C., and medium to high extrusion line speeds (for example, 300 m/min to 800 m/min). These resins may be low density polyethylene (LDPE) polymers. However, generally autoclave LDPE polymers tend to have lower neck-in, but tubular LDPEs tend to be more shear thinning and can be processed at faster line speed and with thinner coating thickness

SUMMARY

Ongoing needs exist to create a polymer blend having a low neck-in and being processable at high extrusion line speeds. Embodiments of this disclosure include polymer blends comprising at least 90% by weight low density polyethylene (LDPE) polymer; and from 1% to 10% by weight ethylene acrylate copolymer. The ethylene acrylate copolymer is the polymerized reaction product of: at least 50% by wt. ethylene, based on the total weight of the monomers present in the ethylene acrylate copolymer; from 2% to 40% by wt. alkyl acrylate, based on the total weight of the monomers present in the ethylene acrylate copolymer; and from 0 to 20 wt. % of monocarboxylic acid monomer, based on the total weight of the monomers present in the ethylene acrylate copolymer.

Embodiments of this disclosure include coated polymer substrates that include a polymer substrate; a coating comprising the polymer blend of this disclosure; and a tie layer disposed between the polymer substrate and the coating.

DETAILED DESCRIPTION

In one or more embodiments of this disclosure, a polymer blend includes at least 90% by weight low density polyethylene (LDPE) polymer and from 1% to 10% by weight ethylene acrylate copolymer. The polymer blend includes at least 90% by weight low density polyethylene (LDPE) polymer and ethylene acrylate copolymer in an amount from 1% to 8% by weight, 1% to 5% by weight, or 1% to 3% by weight.

In some embodiments of the polymer blend, the LDPE polymer is a polymer produced from a tubular reactor. The LDPE polymer may have a density of 0.910 g/cc to 0.930 g/cc. In some embodiments, the LDPE polymer may have a density of from 0.910 g/cc to 0.920 g/cc, from 0.916 g/cc to 0.930 g/cc, from 0.918 g/cc to 0.926 g/cc, or 0.915 g/cc to 0.920 g/cc.

In some embodiments of the polymer blend, the LDPE polymer has a melt index ($I_2$) from 2 g/10 min to 8 g/10 mins as determined in accordance with ASTM D1238 (190° C., 2.16 kg). In various embodiments, the LDPE polymer has a melt index ($I_2$) from 2 g/10 min to 7.7 g/10 min, 2 g/10 min to 6 g/10 min, 2 g/10 min to 5 g/10 mins, or from 2 g/10 min to 4.5 g/10 min.

In one or more embodiments of the polymer blend, the LDPE polymer has a molecular weight distribution (MWD=Mw/Mn) from 5 to 11, from 8 to 10.5, or 8.5 to 11, as determined by a conventional gel permeation chromatography (GPC) method.

In one or more embodiments of the polymer blend, the ethylene acrylate copolymer is the polymerized reaction product of: at least 50% by weight ethylene, based on the total weight of the monomers present in the ethylene acrylate copolymer; from 2% to 40% by wt. of alkyl acrylate, based on the total weight of the monomers present in the ethylene acrylate copolymer; and from 0 to 20 wt. % of monocarboxylic acid monomer, based on the total weight of the monomers present in the ethylene acrylate copolymer.

In various embodiments of the polymer blend, the ethylene acrylate copolymer includes at least 50% by weight ethylene based on the total weight of the monomers present in the ethylene acrylate copolymer and from 10% to 30% by weight of the alkyl acrylate, based on the total weight of the monomers present in the ethylene acrylate copolymer. In one or more embodiments, the ethylene acrylate copolymer comprises 15% to 30% by weight of the alkyl acrylate based on the total of the monomers present in the ethylene acrylate copolymer. In some embodiments, the ethylene acrylate copolymer includes at least 75% by weight ethylene and from 12% to 25% by weight of alkyl acrylate based on the total of the monomers present in the ethylene acrylate copolymer.

In some embodiments of the polymer blend, the alkyl acrylate of the acrylate copolymer may be, by way of example and not limitation, methyl acrylate, ethyl acrylate, n-butyl acrylate, iso-butyl acrylate, or combinations thereof. In various embodiments, the alkyl acrylate is a $C_2$-$C_8$-alkyl acrylate, that is, an alkyl acrylate having an alkyl group with from 1 to 8 carbons.

In various embodiments of the polymer blend, the monocarboxylic acid monomer comprises acrylic acid, methacrylic acid, or combinations thereof.

In one or more embodiments of the polymer blend, the ethylene acrylate copolymer has a melt index ($I_2$) from 2 g/10 mins to 12 g/10 mins as determined in accordance with ASTM D1238 (190° C., 2.16 kg). In some embodiments, the ethylene acrylate copolymer has a melt index ($I_2$) from 4 g/10 mins to 10 g/10 mins.

One or more embodiments of this disclosure include a film comprising a polymer blend according to any embodiment previously described in this disclosure.

In various embodiments, the film including the polymer blend has a neck-in value less than or equal to 140 mm, or less than or equal to 120 mm, or less than or equal to 100 mm, at a temperature from 290° C. to 320° C., at a coating weight from 8 g/m² to 30 g/m² or from 12 g/m² to 25 g/m², and a line speed from 300 m/min to 800 m/min, or from 300 m/min to 500 m/min.

In one embodiment, the film produced from the polymer blend has a neck-in value less than 100 mm, while it is being coated onto a substrate at a 12 g/m² coat weight at a line speed of 500 m/min and a temperature of 320° C. In another embodiment, the film has a neck-in value less than 100 mm, when coated onto paper at a 24 g/m² coat weight at a line speed of 500 m/min and a temperature of 320° C. In other embodiments, the film has a neck-in value less than 100 mm, when coated onto paper at a 24 g/m² coat weight at a line speed of 300 m/min and a temperature of 320° C.

Neck-in value refers to the difference between the die width and the final width of extrude polymer blend of the fabricated article. The neck-in value is influenced by extrudate swelling and, to a lesser degree, by surface tension effects. It is well known that, for conventional ethylene polymers, neck-in values tends to increase as the melt index increases, and melt index increases as the molecular weight decreases.

Embodiments of this disclosure include a coated polymer substrate. The coated polymer substrate includes a polymer substrate and a coating on the polymer substrate that includes any polymer blend of this disclosure and a tie layer disposed between the polymer substrate and the coating.

In one or more embodiments of the coated polymer substrate, the polymer substrate includes polyethylene, polypropylene, polyethylene terephthalate, or polyimide. In some embodiments, the polymer substrate is uniaxially or biaxially oriented.

The polymer blends of the present disclosure may be extrusion coated onto a variety of polymer substrates at medium to high extrusion line speeds (for example, 300 m/min to 800 m/min). The films produced from the polymer blends have a low neck-in value at medium to high extrusion line speeds, which allows for high throughput in the coating line.

Polymerizations

In some embodiments, the LDPE polymer of the polymer blend is produced in a high pressure free-radical initiated polymerization process. For a high pressure, free-radical initiated polymerization process, two basic types of reactors are known. The first type is an agitated autoclave vessel having one or more reaction zones (the autoclave reactor). The second type is a jacketed tube having one or more reaction zones (the tubular reactor).

The pressure in each autoclave and tubular reactor zone of the process is typically from 100 MPa to 400 MPa, more typically from 120 MPa to 360 MPa, and even more typically from 150 MPa to 320 MPa.

The polymerization temperature in each tubular reactor zone of the process is typically from 100° C. to 400° C., more typically from 130° C. to 360° C., and even more typically from 140° C. to 330° C.

The polymerization temperature in each autoclave reactor zone of the process is typically from 150° C. to 300° C., more typically from 165° C. to 290° C., and even more typically from 180° C. to 280° C.

In some embodiments, a tubular reactor having at least three reaction zones may be used to produce the LDPE polymer of the polymer blends of this disclosure.

Initiators

The process to produce the LDPE polymers of the polymer blends of this disclosure is a free-radical polymerization process. The type of free-radical initiator to be used in the present process is not critical, but preferably one of the initiators applied should allow high-temperature operation in the range from 300° C. to 350° C. Examples of suitable free-radical initiators include organic peroxides, such as peresters, perketals, peroxy ketones, percarbonates, and cyclic multifunctional peroxides. These organic peroxy initiators are added to the reactor at from 0.005 wt. % to 0.2 wt. %, based on the total weight of polymerizable monomers in the reactor. Peroxides are typically injected as diluted solutions in a suitable solvent, for example, in a hydrocarbon solvent.

Other suitable initiators include azodicarboxylic esters, azodicarboxylic dinitriles and 1,1,2,2-tetramethylethane derivatives, and other components capable of forming free radicals in the desired operating temperature range.

In one embodiment, an initiator is added to at least one reaction zone of the polymerization reactor. In a further embodiment, the initiator are added to the reactor or the polymerization process at a peak polymerization temperature from 320° C. to 350° C. In a further embodiment, the initiator comprises at least one peroxide group incorporated in a ring structure.

Examples of initiators suitable for polymerizing polyethylene include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. Additional initiators are disclosed in International Publication Nos. WO 02/14379 and WO 01/68723 and are incorporated by reference within this disclosure.

Additives

One or more additives may be added to the polymer blend. Suitable additives include stabilizers; fillers, such as organic or inorganic particles, including clays, talc, titanium dioxide, zeolites, or powdered metals; organic or inorganic fibers, including carbon fibers, silicon nitride fibers, steel wire or mesh, and nylon or polyester cording; nano-sized particles; clays; tackifiers; or oil extenders, including paraffinic or napthelenic oils.

Polymer Fabrications

The polymer blend of this disclosure may be employed in a variety of thermoplastic fabrication processes to produce useful articles, including extrusion coatings and extrusion laminations.

Definitions

Unless stated to the contrary, implicit from the context, or customary in the art, all parts and percentages are based on weight, and all test methods are current as of the filing date of this disclosure.

The terms "blend" or "polymer blend," as used in this disclosure, mean an intimate physical mixture of two or more polymers without physical or chemical reaction between or among the polymers. A blend may be miscible and without phase separation at a molecular level or may be immiscible and evidence some degree of phase separation at a molecular level. A blend may include, but need not include, one or more domain configurations that can be determined from transmission electron spectroscopy, light scattering, x-ray scattering, and other methods known in the art. The blend may be effected by physically mixing the two or more polymers on a macro level or on a micro level. Examples of physical mixing on a macro level include melt blending of resins or compounding. An example of physical mixing on a micro level includes simultaneous formation of the two or more polymers within the same reactor.

The term "polymer" refers to a composition prepared by polymerizing monomers, whether of the same or a different type. Polymers include homopolymers prepared from only one type of monomer with the understanding that trace amounts of impurities can be incorporated into the polymer structure.

The term "ethylene-based polymer" or "ethylene polymer" refers to a polymer that comprises at least 50% by weight polymerized ethylene, based on the total weight of the polymer. Ethylene-based polymers and ethylene polymers may be ethylene homopolymers or may include one or more than one comonomer, provided ethylene has the greatest weight fraction of the polymer, among all monomers in the polymer.

Test Methods

Density: Samples for density measurement are prepared according to ASTM D 1928. Polymer samples are pressed at 190° C. and 30,000 psi for three minutes, and then at 21° C. and 207 MPa for one minute. Measurements are made within one hour of sample pressing using ASTM D792, Method B.

Melt Index: Melt index, or $I_2$, (grams/10 minutes or dg/min) is measured in accordance with ASTM D 1238, Condition 190° C./2.16 kg.

Triple Detector Gel Permeation Chromatography (3D-GPC)

The chromatographic system includes a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. For all Light scattering measurements, the 15 degree angle is used for measurement purposes. The autosampler oven compartment is set at 160° C., and the column compartment is set at 150° C. The columns that may be used include 4 Agilent "Mixed A" 30 cm 20-micron linear mixed-bed columns. The chromatographic solvent that may be used includes 1,2,4 trichlorobenzene and that contains 200 ppm of butylated hydroxytoluene (BHT). The solvent source is nitrogen sparged. The injection volume that may be used includes 200 microliters (μL) and the flow rate was 1.0 milliliters/minute.

Calibration of the GPC column set is performed with at least 20 narrow molecular weight distribution polystyrene standards with molecular weights ranging from 580 to 8,400,000 arranged in 6 "cocktail" mixtures with at least a decade of separation, meaning that there is an order of magnitude of approximately a factor of 10, between individual molecular weights. The standards are purchased from Agilent Technologies. The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80 degrees Celsius with gentle agitation for 30 minutes. The polystyrene standard peak molecular weights are converted to polyethylene molecular weights using Equation 1 (as described in Williams and Ward, J. Polym. Sci., Polym. Let., 6, 621 (1968)):

$$M_{polyethylene} = A \times (M_{polystyrene})^B \qquad (EQ1)$$

where M is the molecular weight, A has a value of 0.4315 and B is equal to 1.0.

A fifth order polynomial is used to fit the respective polyethylene-equivalent calibration points. A small adjustment to A (from approximately 0.415 to 0.44) is made to correct for column resolution and band-broadening effects such that NIST standard NBS 1475 is obtained at 52,000 Mw.

The total plate count of the GPC column set is performed with Eicosane (prepared at 0.04 g in 50 milliliters of TCB and dissolved for 20 minutes with gentle agitation.) The plate count (Equation 2) and symmetry (Equation 3) are measured on a 200 microliter injection according to the following equations:

$$\text{Plate Count} = 5.54 * \left( \frac{(RV_{PeakMax})}{\text{Peak Width at } \frac{1}{2} \text{height}} \right)^2 \qquad (EQ2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})} \qquad (EQ3)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples are prepared in a semi-automatic manner with the PolymerChar "Instrument Control" Software, wherein the samples are weight-targeted at 2 mg/mL, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ are based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \quad (EQ\ 4)$$

$$Mw_{(GPC)} = \frac{\sum_i (IR_i * M_{polyethylene_i})}{\sum_i IR_i} \quad (EQ\ 5)$$

$$Mz_{(GPC)} = \frac{\sum_i (IR_i * M_{polyethylene_i}^2)}{\sum_i (IR_i * M_{polyethylene_i})} \quad (EQ\ 6)$$

In order to monitor the deviations over time, a flowrate marker (decane) is introduced into each sample via a micropump controlled with the PolymerChar GPC-IR system. This flowrate marker (FM) was used to linearly correct the pump flowrate ($Flowrate_{(nominal)}$) for each sample by RV alignment of the respective decane peak within the sample ($RV_{(FM\ Sample)}$) to that of the decane peak within the narrow standards calibration ($RV_{(FM\ Calibrated)}$). Any changes in the time of the decane marker peak is assumed to be related to a linear-shift in flowrate ($Flowrate_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/-2% of the nominal flowrate.

$$Flowrate_{(effective)} = Flowrate_{(nominal)} * (RV_{(FM\ Calibrated)} / RV_{(FM\ Sample)}) \quad (EQ7)$$

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, is obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

Other respective moments, $Mn_{(Abs)}$ and $Mz_{(Abs)}$ are be calculated according to equations 8-9 as follows:

$$Mn_{(Abs)} = \frac{\sum_i IR_i}{\sum_i (IR_i / M_{Absolute_i})} \quad (EQ\ 8)$$

$$Mz_{(Abs)} = \frac{\sum_i (IR_i * M_{Absolute_i}^2)}{\sum_i (IR_i * M_{Absolute_i})} \quad (EQ\ 9)$$

Extrusion Coating:

To produce an extrusion coated substrate, Davis Standard ER-WE-PA, Maschinenfabrik Erkrath Nr. 7237, year of construction 1990, with an EBR (edge bead reduction) flat is used. The Davis Standard ER-WE-PA, Maschinenfabrik Erkrath Nr. has a 1050 mm wide slit die (maximum substrate width 800 mm), is equipped with a feed-block co-extrusion system, and the extruders have an output of up to 350 kg/h of polymer. The molten polymer exits the die with a temperature of 260-340° C.; the air gap is set at 250 mm and the nip-off was set at −15 mm. For these evaluations as single slot feed block and the largest extruder "A" with an ET Barr 3.5 inch double flight compression screw L/D 32. This Davis Standard ER-WE-PA line is part of the Pack Studio in Horgen. The molten polymer is coated onto the paper substrate and cooled by the chill roll with the chill roll temperature 15° C.

Air gap: 250 mm
Nip offset: −15 mm
Extrusion set temperature: 320° C.
Substrate: 60 g/m² kraft paper

EXAMPLES

Six example compositions were prepared, and polymer characteristics of each were measured.

Example 1 was a polymer blend prepared from 97% by weight AGILITY™ EC 7000 manufactured by Dow Inc. as the LDPE component and 3% ELVALOY™ AC 2618 manufactured by Dow Inc. as the acrylate copolymer.

Example 2 was a polymer blend prepared from 97% by weight of AGILITY™ EC 7000 manufactured by Dow Inc. as the LDPE component and 3% ELVALOY™ AC 3427 manufactured by Dow Inc. as the acrylate copolymer.

Example 3 was a polymer blend prepared from 97% by weight of AGILITY™ EC 7000 manufactured by Dow Inc. as the LDPE component and 3% ELVALOY™ AC 3717 manufactured by Dow Inc. as the acrylate copolymer.

Example 4 was a polymer blend prepared from 97% by weight of AGILITY™ EC 7000 manufactured by Dow Inc. as the LDPE component and 3% ELVALOY™ AC 1820 manufactured by Dow Inc. as the acrylate copolymer.

Comparative Example C1 was 100% by weight of AGILITY™ EC 7000 manufactured by Dow Inc. as an example of a LDPE produced in a tubular reactor.

Comparative Example C2 was 100% by weight of LDPE PT 7007 manufactured by Dow Inc. and an example of an LDPE produced in an autoclave reactor.

Characteristics of each of the polymer blends and comparative polymers are summarized in Table 1.

TABLE 1

Polymer Characteristics

| Example | Composition | MI dg/min | Density g/cm³ | Monomer* | % |
|---|---|---|---|---|---|
| Example 1 | AGILITY EC 7000 | 3.9 | 0.919 | EE | 97 |
|  | ELVALOY ™ AC 2618 | 6 |  | EA | 3 |
| Example 2 | AGILITY EC 7000 | 3.9 | 0.919 | EE | 97 |
|  | ELVALOY ™ AC 3427 | 4 |  | BA | 3 |
| Example 3 | AGILITY EC 7000 | 3.9 | 0.919 | EE | 97 |
|  | ELVALOY ™ AC 3717 | 7 |  | BA | 3 |
| Example 4 | AGILITY EC 7000 | 3.9 | 0.919 | EE | 97 |
|  | ELVALOY ™ AC 1820 | 8 |  | MA | 3 |
| Comparative C1 | AGILITY EC 7000 | 3.9 | 0.919 | EE | 100 |
| Comparative C2 | LDPE PT 7007 | 7.4 |  | EE | 100 |

*Abbreviations - EE: ethylene; EA: ethyl acrylate; BA: butyl acrylate; MA: methyl acrylate.

Each inventive and comparative example was extruded on a 3.5-inch diameter screw, with a length over diameter (L/D) ratio of 32, onto 70 g/m² Kraft paper in an amount (coating weight) of 25 g/m². Melt pressure and melt temperature were recorded with thermocouples placed in the adapter. The melt was delivered through a Davis Standard/Er-We-Pa flex lip edge bead reduction die, Series 510A, nominally set to a die gap of 0.7 mm. The melt drawing and application of the melt vertically onto the moving substrate was performed at an air gap of 250 mm and a nip off-set of 15 mm, toward the pressure roll. The melt was applied onto the moving substrate in the laminator nip (the point at which the pressure roll and the substrate come into contact), with a rubber surface layer contacting the water cooled chill roll with a matte surface finish, and maintained at a temperature of 15° C. to 20° C. The air gap is defined as the vertical distance between the die lip and the laminator nip. The nip off-set is defined as the horizontal off-set of the die lip position relative to the laminator nip.

Table 2 summarizes the results of the neck-in determination for Comp. C1, Comp C2, and Examples 1 to 4. To determine the neck-in value of the polymer blends, specifically Examples 1 to 4, each polymer blend and the comparative examples were coated onto a substrate, specifically paper as previously described. The conditions, listed in Table 1, include a line speed of 300 m/min or 500 m/min. The polymer substrates were coated to a coat weight of 12 g/m² or 24 g/m² at a temperature of 320° C.

TABLE 2

Extrusion Coating Neck-in Values at Speeds of 300 m/min and 500 m/min

| | Neck-in (mm) | | |
|---|---|---|---|
| Example | 24 g/m² and 300 m/min | 24 g/m² and 500 m/min | 12 g/m² and 500 m/min |
| Comparative C1 | 124 | 118 | 112 |
| Comparative C2 | 103 | N/A | N/A |
| Example 1 | 96 | 99 | 93 |
| Example 2 | 96 | 96 | 91 |
| Example 3 | 96 | 98 | 90 |
| Example 4 | 100 | 98 | 92 |

When evaluating the performance of each polymer blend of Examples 1 to 4 and of the polymers of the comparative examples, the smaller the neck-in value is more desirable. A neck-in value suitable for extrusion coating is less than or approximately equal to 100 mm. Lower neck-in values indicate greater dimensional stability of the web—the polymer after being extruded through the die. When the web is more dimensionally stable, the coating of the substrate can be more tightly controlled allowing for smooth application of the polymer to the substrate.

Comparative C1 was an ethylene polymer produced in a tubular reactor. Comparative C2 to was an ethylene polymer produced in an autoclave reactor. Comparative C1 had a neck-in value greater than 100 mm at line speeds of 300 m/min and 500 m/min. Comparative C2 had a neck-in value of 103 mm at the medium speed of 300 m/min but could not be extruded onto the substrate at all at 500 m/min.

The invention claimed is:
1. A coated polymer substrate comprising:
    a polymer substrate;
    a coating comprising a polymer blend; and
    a tie layer disposed between the polymer substrate and the coating;
    wherein the polymer blend comprises:
        at least 90% by weight low density polyethylene (LDPE) polymer; and
        from 1% to 10% by weight ethylene acrylate copolymer, wherein the ethylene acrylate copolymer is the polymerized reaction product of:
            at least 75% by wt. ethylene, based on the total wt. % of the monomers present in the ethylene acrylate copolymer;

from 12% to 25% by wt. of alkyl acrylate, based on the total wt. % of the monomers present in the ethylene acrylate copolymer; and 0 wt. % of monocarboxylic acid monomer, based on the total wt. % of the monomers present in the ethylene acrylate copolymer; and wherein the ethylene acrylate copolymer has a melt index ($I_2$) from 4 g/10 mins to 10 g/10 mins as determined in accordance with ASTM D1238 (190° C. 2.16 kg).

2. The coated polymer substrate of claim 1, wherein the polymer substrate comprises polyethylene, polypropylene, polyethylene terephthalate, or polyamide.

3. The coated polymer substrate of claim 1, wherein the polymer substrate is uniaxially or biaxially oriented.

4. The coated polymer substrate of claim 1, wherein the LDPE polymer has a density of 0.910 g/cc to 0.930 g/cc, and a melt index ($I_2$) from 2 g/10 mins to 5 g/10 mins as determined in accordance with ASTM D1238 (190° C., 2.16 kg).

5. The coated polymer substrate of claim 1, wherein the polymer blend comprises from 1% to 5% by wt. of the ethylene acrylate copolymer.

6. The coated polymer substrate of claim 1, wherein the LDPE polymer is a tubular polymer.

7. The coated polymer substrate of claim 1, wherein the alkyl acrylate has an alkyl group from 1 to 8 carbons.

8. The coated polymer substrate of claim 1, wherein the alkyl acrylate comprises methyl acrylate, ethylene acrylate, n-butyl acrylate, iso-butyl acrylate, or combinations thereof.

9. The coated polymer substrate of claim 1, wherein the coating is a film.

10. The coated polymer substrate of claim 9, wherein the film has a neck-in less than 100 mm, when coated onto paper at a 12 g/m² coat weight at a line speed of 500 m/min and a temperature of 320° C.

* * * * *